US 8,705,517 B2

(12) United States Patent
Ress et al.

(10) Patent No.: US 8,705,517 B2
(45) Date of Patent: Apr. 22, 2014

(54) FORCED HOLD CALL HANDLING IN A VOP ENVIRONMENT

(75) Inventors: David P. Ress, Cary, NC (US); William D. Gentry, Raleigh, NC (US); Brian Stucker, Sachse, TX (US); Olga Wagner, Durham, NC (US)

(73) Assignee: Rockstar Consortium US LP, Plano, TX (US)

( * ) Notice: Subject to any disclaimer, the term of this patent is extended or adjusted under 35 U.S.C. 154(b) by 0 days.

(21) Appl. No.: 13/539,801

(22) Filed: Jul. 2, 2012

(65) Prior Publication Data
US 2012/0269100 A1 Oct. 25, 2012

Related U.S. Application Data

(63) Continuation of application No. 12/509,528, filed on Jul. 27, 2009, now Pat. No. 8,233,591, which is a continuation of application No. 11/316,430, filed on Dec. 22, 2005, now Pat. No. 7,587,031.

(51) Int. Cl.
H04L 12/66 (2006.01)
(52) U.S. Cl.
USPC ........... 370/352; 370/353; 370/354; 370/355; 370/356; 379/37; 379/46; 379/201.01; 379/229; 379/352; 709/201; 709/229
(58) Field of Classification Search
USPC ................. 370/259–271, 351–357; 348/14.01–14.16; 709/201–207, 709/217–248; 455/3.01–3.06, 400–426.2, 455/432.1–466, 550.1–560, 575.1–575.9, 455/90.1–90.3
See application file for complete search history.

(56) References Cited

U.S. PATENT DOCUMENTS

| 5,475,745 | A | 12/1995 | Boyle |
| 6,031,905 | A * | 2/2000 | Furman et al. ........... 379/215.01 |
| 6,374,102 | B1 * | 4/2002 | Brachman et al. ......... 455/422.1 |
| 7,095,836 | B2 | 8/2006 | Wengrovitz |
| 7,126,939 | B2 * | 10/2006 | Barany et al. ................. 370/352 |
| 7,145,997 | B2 * | 12/2006 | Poikselka et al. ........ 379/210.01 |

(Continued)

FOREIGN PATENT DOCUMENTS

| JP | 2004363818 A | 12/2004 |
| WO | 03049467 A1 | 6/2003 |

OTHER PUBLICATIONS

Notice of Allowance for U.S. Appl. No. 11/316,430 mailed May 14, 2009, 6 pages.

(Continued)

Primary Examiner — Hemant Patel
(74) Attorney, Agent, or Firm — Withrow & Terranova, PLLC

(57) ABSTRACT

The present invention provides a technique for providing a forced hold service such as is used for an emergency services call, which is supported at least in part over a packet network. The forced hold service acts to effectively hold a connection for the call with a called party, even when the caller takes an action that would normally end a call, such as going on hook, pressing end, or the like. When the caller takes an action that would normally end the call, the forced hold service allows the caller to automatically reconnect to the emergency services provider over the held connection upon going offhook, pressing send, or the like. Alternatively, the emergency services provider can effectively re-engage the call wherein the caller is reconnected over the held connection upon going offhook, pressing send, or the like.

28 Claims, 12 Drawing Sheets

(56) References Cited

U.S. PATENT DOCUMENTS

| | | | |
|---|---|---|---|
| 7,260,186 B2 | 8/2007 | Zhu et al. | |
| 7,587,031 B1* | 9/2009 | Ress et al. | 379/45 |
| 7,680,252 B2* | 3/2010 | Elder | 379/37 |
| 8,233,591 B2* | 7/2012 | Ress et al. | 379/45 |
| 2004/0068572 A1 | 4/2004 | Wu | |
| 2004/0258050 A1* | 12/2004 | Sylvain et al. | 370/352 |
| 2004/0264430 A1* | 12/2004 | Wonak et al. | 370/338 |
| 2005/0083911 A1* | 4/2005 | Grabelsky et al. | 370/352 |
| 2005/0213518 A1* | 9/2005 | Ahya et al. | 370/276 |
| 2006/0153342 A1* | 7/2006 | Sasaki | 379/37 |
| 2006/0251231 A1 | 11/2006 | Arai | |
| 2008/0118047 A1 | 5/2008 | Nachum | |

OTHER PUBLICATIONS

Advisory Action for U.S. Appl. No. 11/316,430 mailed Apr. 9, 2009, 3 pages.

Final Office Action for U.S. Appl. No. 11/316,430 mailed Nov. 25, 2008, 9 pages.

Non-final Office Action for U.S. Appl. No. 11/316,430 mailed Jul. 1, 2008, 15 pages.

Non-final Office Action for U.S. Appl. No. 11/316,430 mailed Nov. 20, 2007, 12 pages.

Notice of Allowance for U.S. Appl. No. 12/509,528 mailed Mar. 21, 2012, 5 pages.

Notice of Allowance for U.S. Appl. No. 12/509,528 mailed Nov. 1, 2011, 8 pages.

Non-final Office Action for U.S. Appl. No. 12/509,528 mailed Jun. 7, 2011, 9 pages.

European Search Report for European Patent Application No. 07024922.2, dated Nov. 18, 2009, 7 pages.

Notice of Allowance for U.S. Appl. No. 11/615,545 mailed Jun. 7, 2012, 7 pages.

Non-final Office Action for U.S. Appl. No. 11/615,545 application mailed Feb. 23, 2012, 5 pages.

Non-final Office Action for U.S. Appl. No. 11/615,545 mailed Sep. 1, 2011, 7 pages.

* cited by examiner

FORCED HOLD CALL HANDLING IN A VOP ENVIRONMENT

CROSS-REFERENCE TO RELATED APPLICATION

The present application is a continuation of U.S. patent application Ser. No. 12/509,528, filed on Jul. 27, 2009, which was a continuation of U.S. Pat. No. 7,587,031, issued on Sep. 8, 2009, the disclosures of both applications are hereby incorporated by reference in its entirety; therefore, the present application claims priority to both the application and patent.

FIELD OF THE INVENTION

The present invention relates to telecommunications, and in particular to handling forced hold calls in a voice over packet (VoP) environment.

BACKGROUND OF THE INVENTION

Packet networks, such as the Internet, have evolved to a point where voice communications are capable of being supported with quality rivaling that of the traditional public switched telephone network (PSTN). Since packet communications are inherently more efficient than the circuit-switched communications of the PSTN and allow voice calls to be associated with any number of other media sessions to provide advanced services, traditional telephony services are now supported over packet-based networks.

Two of the challenges with providing traditional telephony services over packet networks are meeting the expectations of the public and fulfilling legal requirements associated with telephony services. The public demands a telephone experience emulating that of the PSTN. In essence, the public needs a packet telephony interface to behave like a traditional telephony interface, which provides dial tones, dialed digit tones, ringing signals, busy signals, call waiting alerts, and the like. Service providers for packet telephony services are building terminals and configuring network devices to emulate traditional telephony service.

From a legal perspective, there are various requirements for telephony services. These requirements need to be fulfilled for packet telephony services. Of particular importance are the requirements for handling emergency services calls, such as those invoked when dialing 911 in the United States. In general, emergency services calls must be given priority and be immediately connected to an emergency services call center. Once an emergency call is connected, a forced hold service may be invoked to assist in maintaining a connection with the caller's telephone terminal, even if the telephone terminal goes onhook or otherwise holds the call session. If the telephone terminal goes onhook, the connection is maintained to allow the caller to quickly reconnect to emergency services by simply taking the telephone terminal offhook. Alternatively, the emergency services operator can initiate a ringback function to cause the telephone terminal to ring, wherein the telephone terminal is reconnected to the maintained connection upon the telephone terminal going offhook.

Accordingly, there is a need for an efficient and reliable technique to provide a forced hold service in a packet network environment. Given the significant emergency services infrastructure already provided by the PSTN, there is a further need to take advantage of the PSTN's emergency services infrastructure when providing forced hold services in a packet network environment.

SUMMARY OF THE INVENTION

The present invention provides a technique for providing a forced hold service such as is used for an emergency services call, which is supported at least in part over a packet network. The forced hold service acts to effectively hold a connection for the call with a called party, even when the caller takes an action that would normally end a call, such as going on hook, pressing end, or the like. When the caller takes an action that would normally end the call, the forced hold service allows the caller to automatically reconnect to the emergency services provider over the held connection upon going offhook, pressing send, or the like. Alternatively, the emergency services provider can effectively re-engage the call wherein the caller is reconnected over the held connection upon going offhook, pressing send, or the like.

The present invention is particularly applicable to emergency services calls, such as 911 calls, where at least a portion of the emergency services call is supported over a packet network. A communication client and a service node cooperate to provide control of the emergency services calls. The communication client is provided in a packet telephone terminal or integrated into a terminal adaptor or termination device, which is coupled to the packet network and provides an interface to an analog telephone. To initiate an emergency services call, a caller will dial an emergency services number. In response, the communication client will send a session initiation message to the service node, which will act to establish a packet communication session for the emergency services call and perhaps a circuit-switched connection over the PSTN to an emergency services access point to support the emergency services call. Once the emergency services call is established, the communication client is configured or may already have been configured to respond to a disconnect event by sending a disconnect indication to the service node, which will respond by placing the packet communication session on hold instead of taking action to end the emergency services call.

The communication client may also be configured to ignore flash events as well as cooperate with the service node to restore the packet communication session from hold upon detecting a reconnect event or ringback event. A reconnect event is an event where the caller attempts to reconnect to the emergency services call after the packet communication session has been placed on hold for the disconnect event. A ringback event is an event where an emergency services operator attempts to reestablish the emergency services call after the packet communication session has been placed on hold for the disconnect event.

To identify that a call is an emergency services call, the communication client may be configured with one or more dialing plans corresponding to emergency services directory numbers. The communication client can monitor dialed digits and identify an emergency services call when the digits dialed to initiate the call correspond to an emergency services directory number. Alternatively, the communication client may pass the dialed digits to the service node, which can identify the call as an emergency services call based on the dialed digits. The service node may then send a message to the communication client to indicate that the call is an emergency services call and that appropriate action should be taken to handle flash events, disconnect events, reconnect events, and ringback events. In a second embodiment of the invention, the service node acts alone to provide the forced hold service without cooperation from the communication client.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a technique for providing a forced hold service such as is used for an emergency services call, which is supported at least in part over a packet network. The forced hold service acts to effectively hold a connection for the emergency services call with an emergency services provider, even when the caller takes an action that would normally end a call, such as going on hook, pressing end, or the like. When the caller takes an action that would normally end the call, the forced hold service allow the caller to automatically reconnect to the emergency services provider over the held connection upon going offhook, pressing send, or the like. Alternatively, the emergency services provider can initiate a ringback function wherein the caller is reconnected over the held connection upon going offhook, pressing send, or the like. Prior to delving into the details of the present invention, an overview of an exemplary communication environment in which a forced hold service can be employed in a packet network is illustrated. For purposes of illustration only, the forced hold control is provided in an emergency services environment. Those skilled in the art will recognize that the invention is applicable to any forced hold scenario, such as those provided in malicious call hold scenarios.

Figure 1:
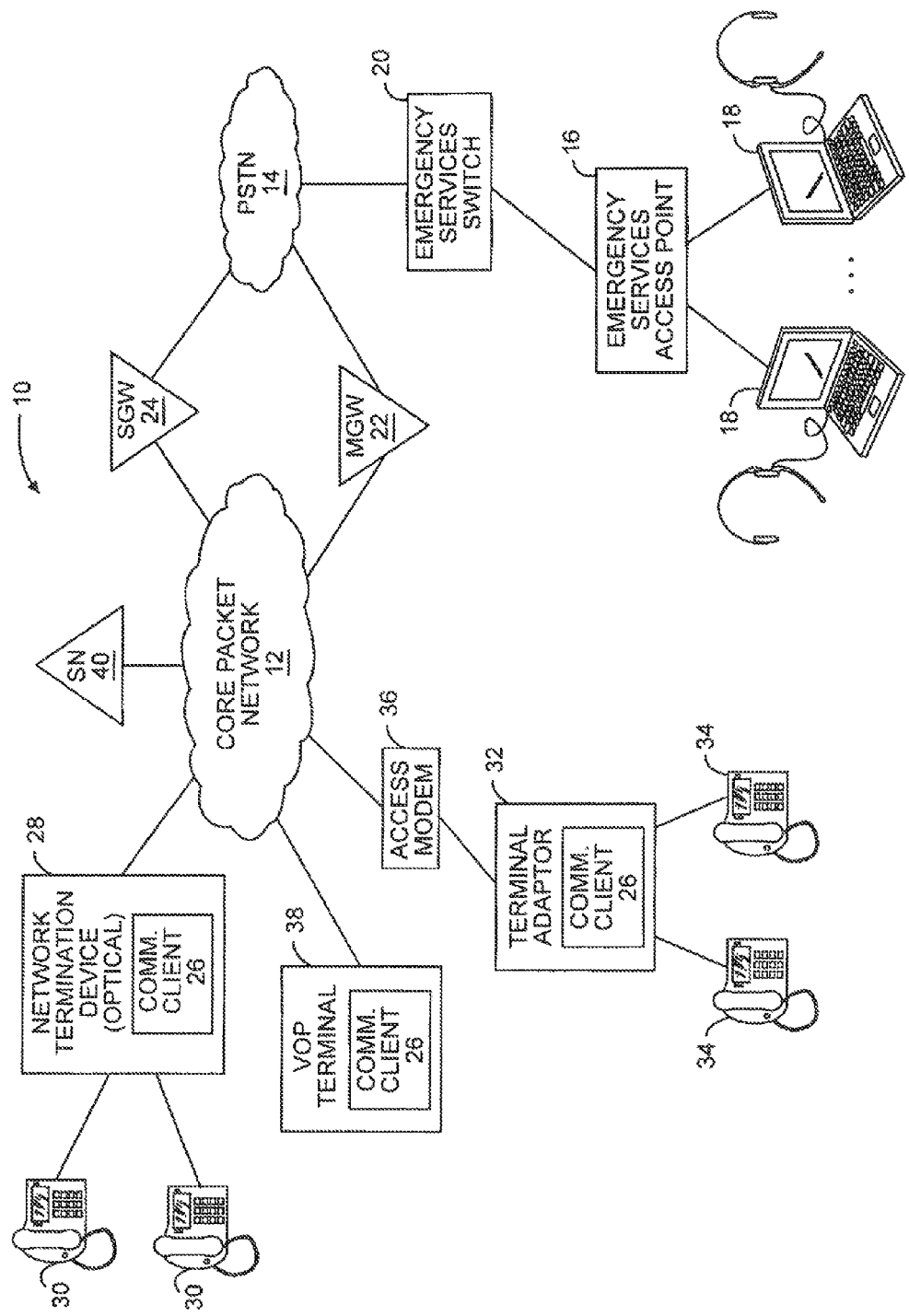
FIG. 1 is a block representation of a communication environment in which emergency services may be implemented according to one embodiment of the present invention.

With reference to FIG. 1, a communication environment 10 is illustrated and includes a core packet network 12 and a public switched telephone network (PSTN) 14. Emergency services are provided in traditional fashion in association with the PSTN 14. In particular, an emergency services access point 16 provides automatic call processing and routing to any number of emergency services operator terminals 18, which are used by emergency services operators when responding to emergency services calls. An emergency services switch 20 is a dedicated circuit-switched telephony switch that connects to the PSTN 14 and is used to route emergency services calls to the emergency services access point 16 and support the circuit-switched connection between the emergency services operator terminals 18 and a communication terminal or other entity residing on the PSTN 14.

To support emergency services for calls initiated over the core packet network 12, a signaling interface is provided by a signaling gateway (SGW) 24, which provides a signaling interface between the core packet network 12 and the PSTN 14 in traditional fashion. Further, the actual connections for calls established between the core packet network 12 and the PSTN 14 are established through a media gateway (MGW) 22. The media gateway 22 provides the requisite processing to support packet communications over a packet communication session supported by the core packet network 12 and circuit-switched communications over the PSTN 14. For any type of telephony call spanning the core packet network 12 and the PSTN 14, the media gateway 22 will support a packet communication session over the core packet network 12 and a circuit-switched connection over the PSTN 14. For an emergency services call, a circuit-switched connection extends between the operator terminals 18 through the emergency services access point 16, the emergency services switch 20, and the PSTN 14 to the media gateway 22.

A corresponding packet communication session will extend to the emergency services caller's communication terminal, which may take many forms as illustrated in FIG. 1. Notably, the signaling for establishing the packet communication session as well as a circuit-switched connection call spanning the core packet network 12 and the PSTN 14 will be handled by the signaling gateway 24. The functionality of the signaling gateway 24 and the media gateway 22 may be provided in separate entities or combined in a single entity.

The communication terminal used by a caller to initiate an emergency services call may take various forms. Regardless of the form, a communication client 26 will be provided in the communication terminal or in a device associated with the communication terminal to facilitate telephony calls and other multimedia communications. Various communication terminal embodiments are illustrated in FIG. 1. The illustrated embodiments are merely exemplary and not intended to provide a comprehensive list of communication terminal embodiments.

As illustrated, a network termination device 28 may function to terminate an access network to the core packet network 12, as well as emulate a traditional plain old telephone system (POTS) interface to traditional POTS telephones 30 at a residence or business location. For example, the network termination device 28 may terminate a fiber optic access network, which connects to the core packet network 12, and may appear as a POTS line from the PSTN to the POTS telephones 30. The communication client 26 will assist in establishing packet-based connections to support telephony calls, and perhaps assist in emulating the POTS line interface to the POTS telephones 30.

The communication client 26 may also be implemented in a terminal adaptor 32, which supports POTS-based telephones 34 and is configured to interact with an access modem 36, which provides a broadband interface through an appropriate access network to the core packet network 12. Accordingly, the terminal adaptor 32 is relatively analogous to the network termination device 28, wherein the communication client 26 will support packet-based communication sessions to facilitate telephony or other multimedia applications as well as emulate a POTS interface for the POTS telephones 34.

The communication client 26 may be implemented in the communication terminal itself. Accordingly, a Voice over Packet (VoP) terminal 38 may represent a packet-based telephone, personal computer, or personal digital assistant capable of providing packet-based communications, an in particular, packet-based telephony calls.

For packet-based communications, a service node (SN) 40 is provided to facilitate the establishment and control of packet-based communication sessions involving a communication client 26. In certain embodiments, the service node 40 may also act as a proxy for the communication clients 26. Although the present invention can be employed using various protocols, the following illustrations use the Session Initiation Protocol (SIP) and the associated Session Description Protocol (SDP) to facilitate and control packet-based communication sessions that are used in part for an emergency services call. SIP provides the signaling and control messages associated with the packet-based communication session, and SDP is primarily used to provide information allowing the communication endpoints to communicate with each other. For example, SDP may be used to exchange address, port, and codec information for the packet-based communication sessions. For reference, the communication client 26 may be considered a user agent, and the service node 40 may be considered a back-to-back user agent or SIP proxy in a SIP environment. Those skilled in the art will recognize that user agents may be implemented in different types of communication devices to support communications on behalf of a standalone or integrated communication system.

For an emergency services call, a packet-based communication session will be established between the communication client 26 and the media gateway 22 under control of the service node 40. A circuit-switched connection will be established between the media gateway 22 and the emergency services access point 16, which will act to connect the call to an appropriate emergency services operator terminal 18.

Figure 2:
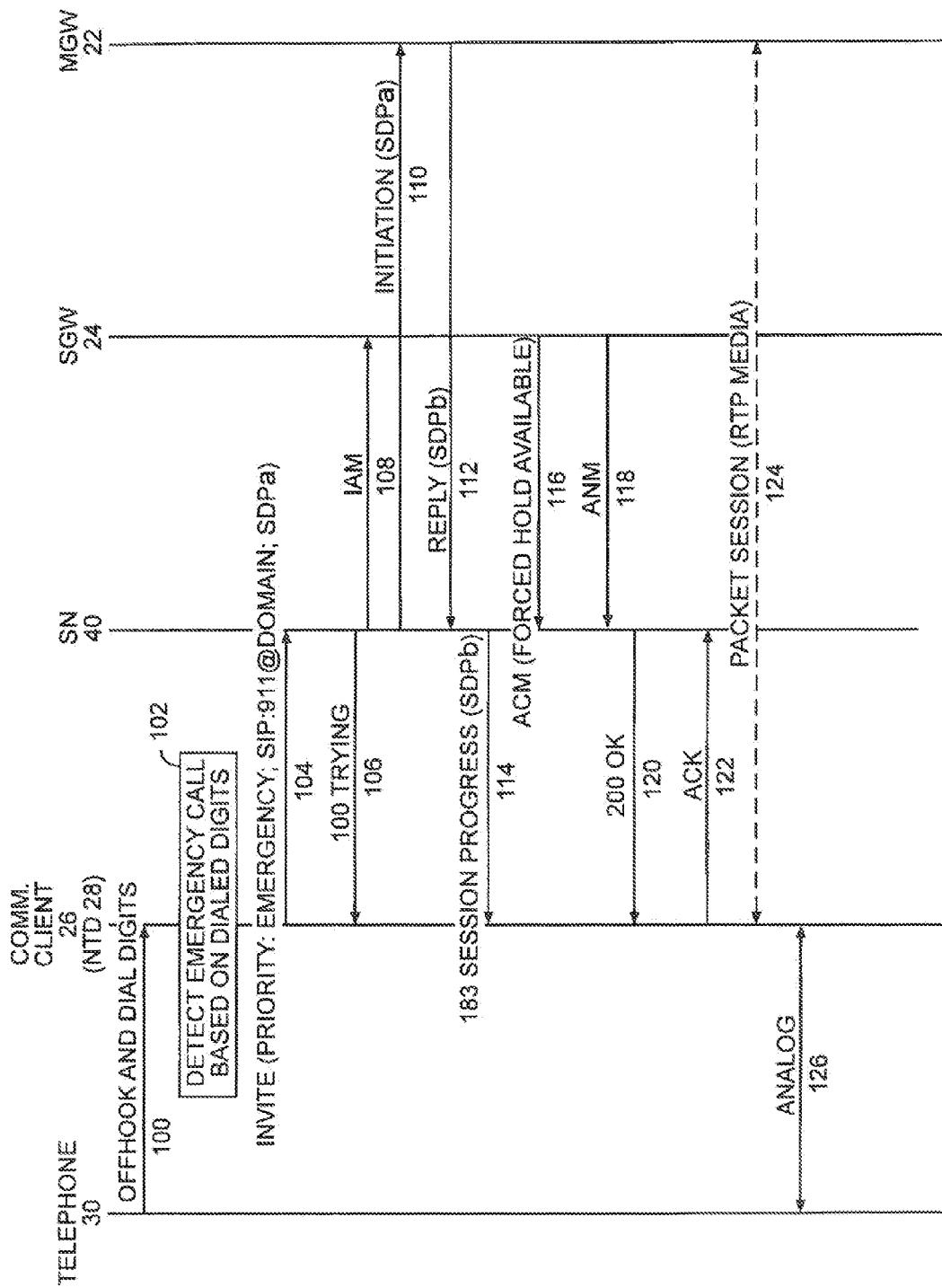
FIG. 2 is a communication flow diagram illustrating the establishment of an emergency services call according to one embodiment of the present invention.
Figure 3:
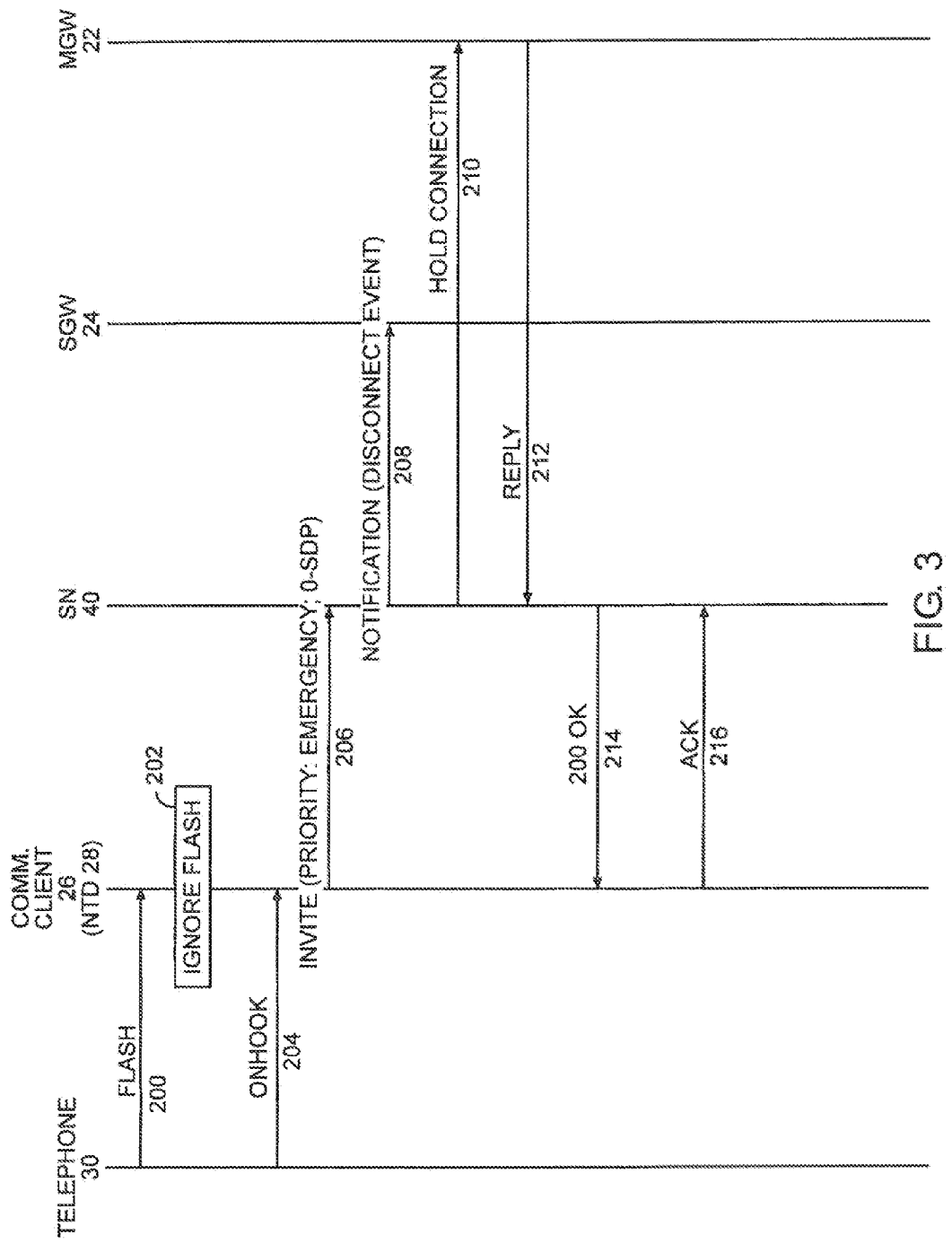
FIG. 3 is a communication flow diagram illustrating flash and disconnect handling according to one embodiment of the present invention.
Figure 4:
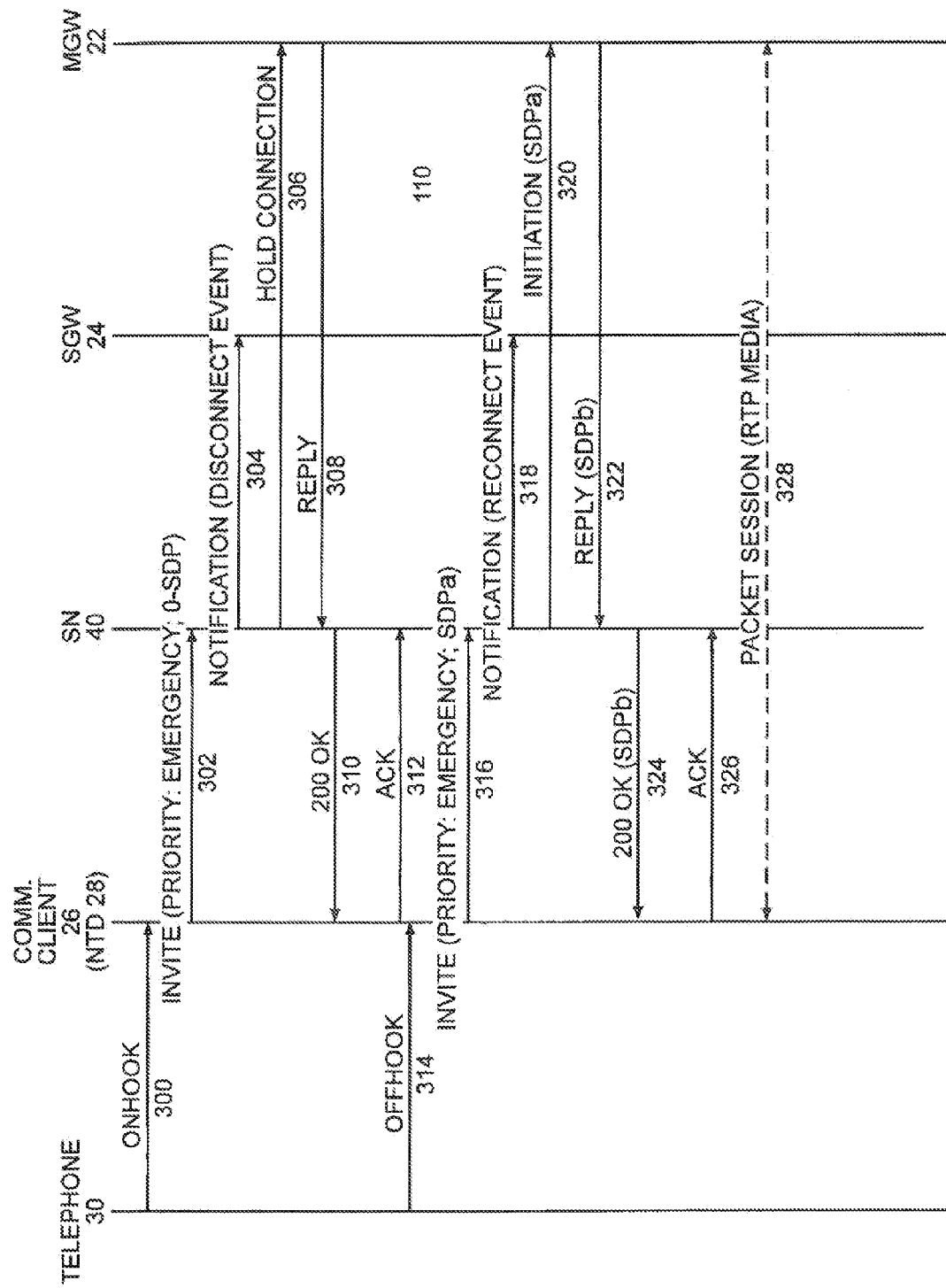
FIG. 4 is a communication flow diagram illustrating a reconnect process according to one embodiment of the present invention.
Figure 5:
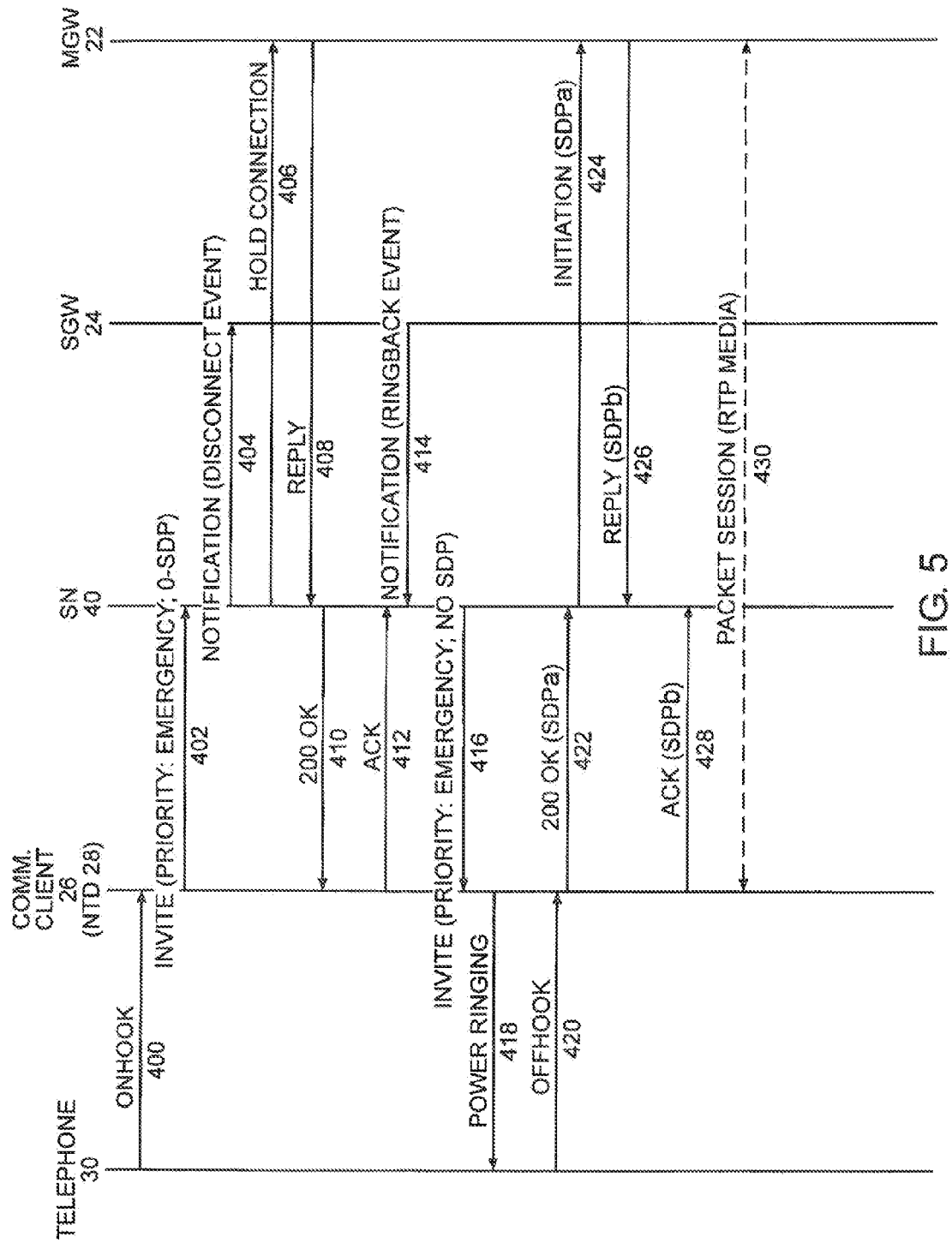
FIG. 5 is a communication flow diagram illustrating a ringback function according to one embodiment of the present invention.
Figure 6:
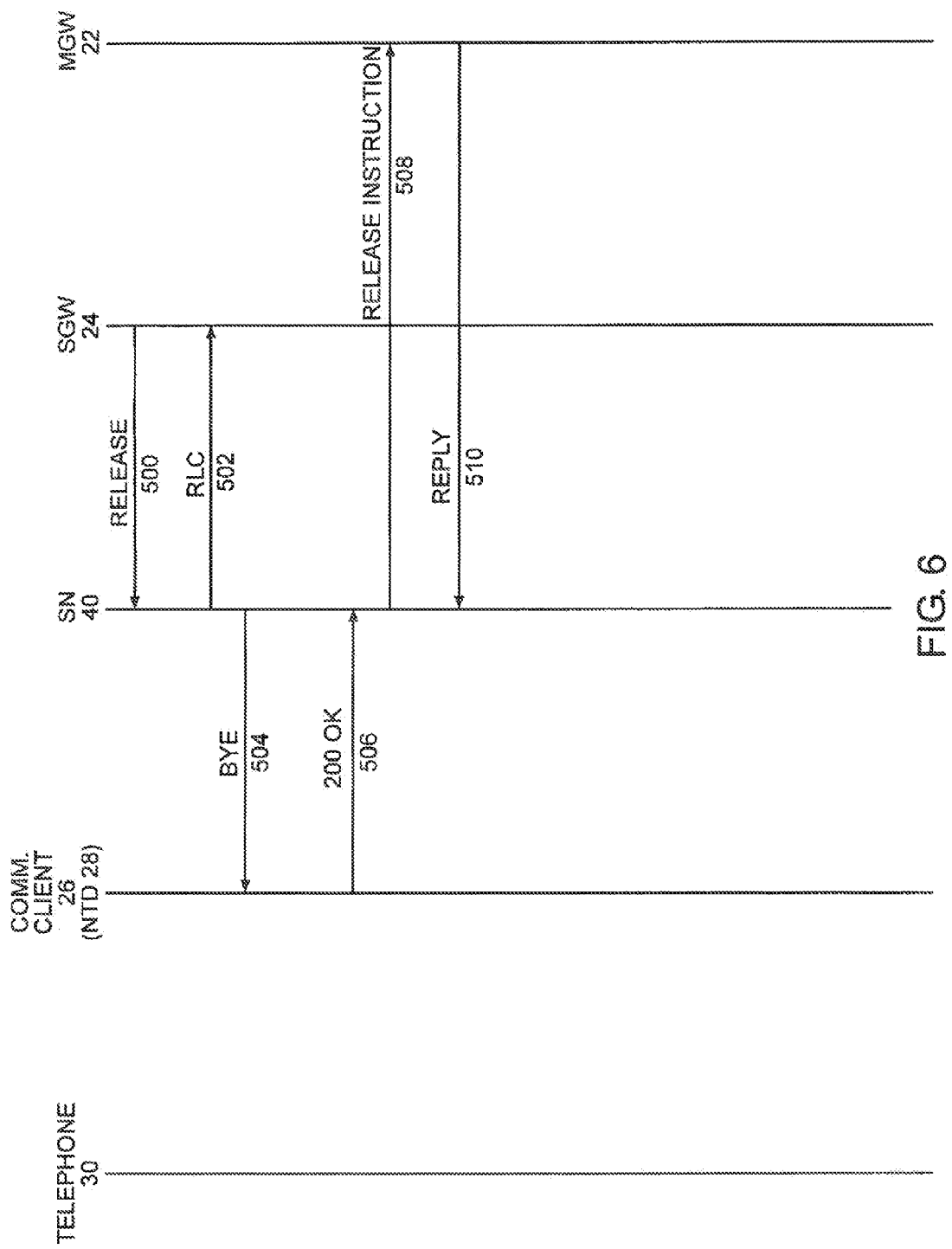
FIG. 6 is a communication flow diagram illustrating release of an emergency services call according to one embodiment of the present invention.
Figure 7:
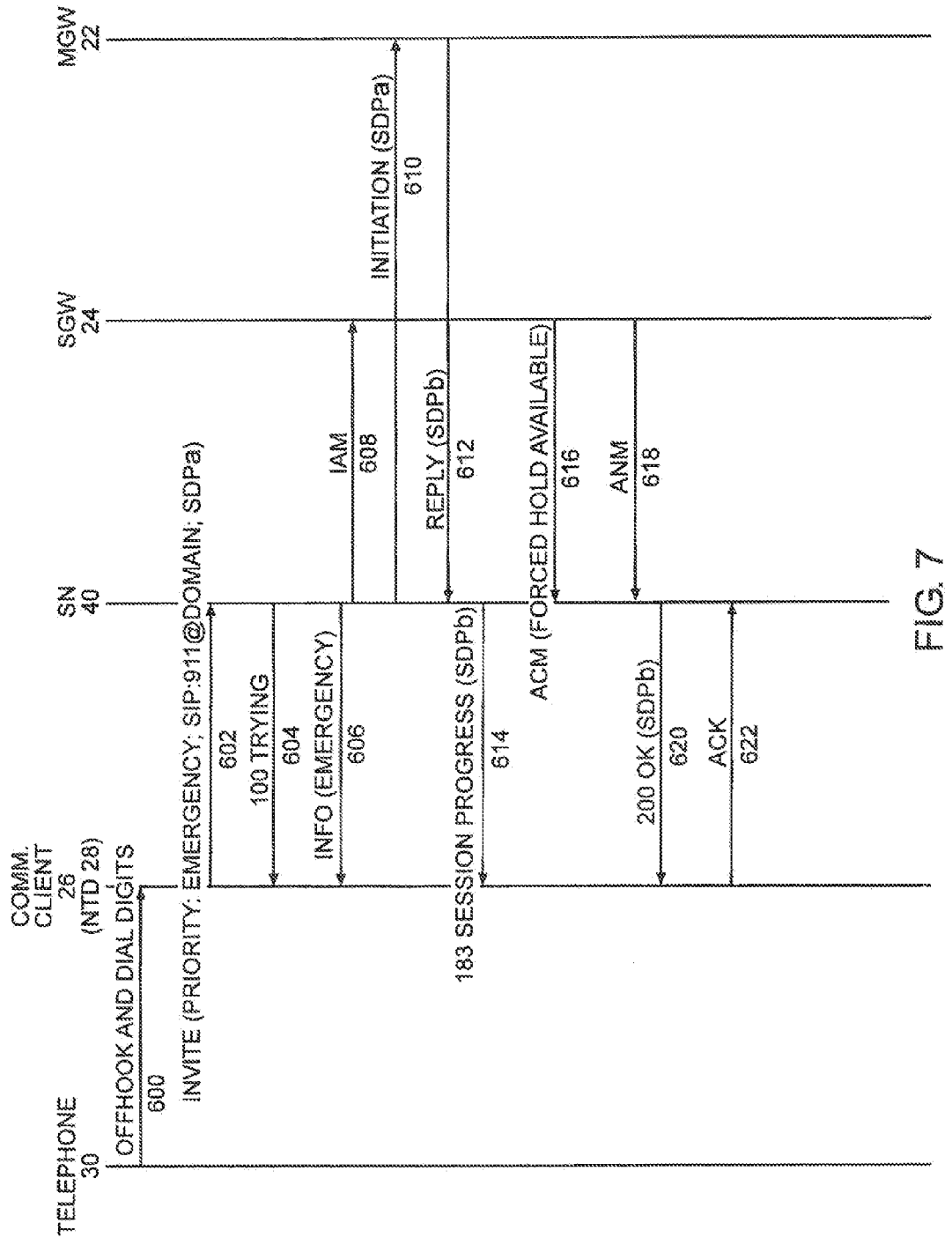
FIG. 7 is a communication flow diagram illustrating establishment of an emergency services call according to an alternate embodiment of the present invention.
Figure 8:
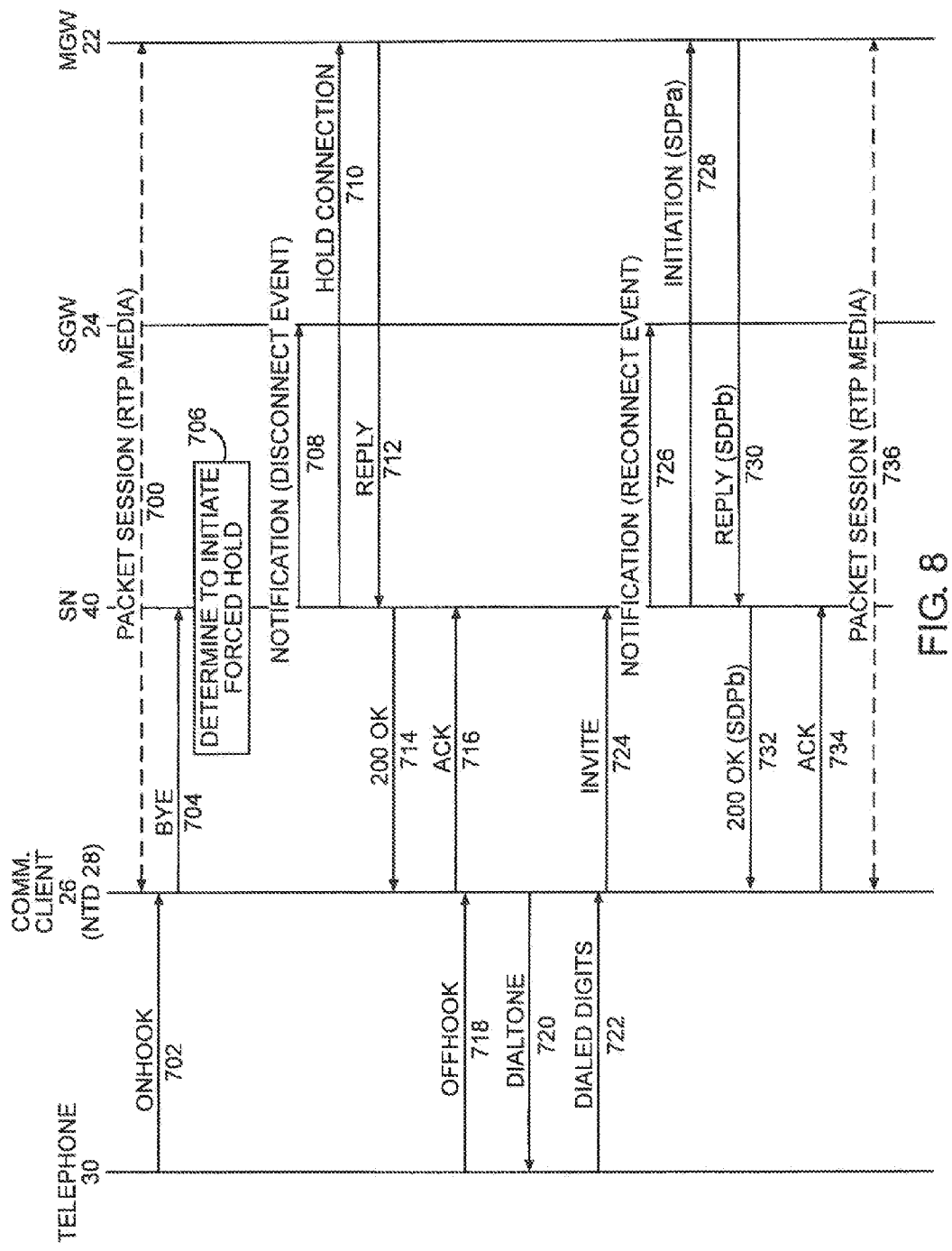
FIG. 8 is a communication flow diagram illustrating a reconnect process according to a second embodiment of the present invention.

FIGS. 2-7 illustrate various communication flows that represent different aspects for handling an emergency services call according to one embodiment of the present invention. In particular, FIG. 2 illustrates initiating and establishing an emergency services call. FIG. 3 illustrates how flash and disconnect attempts are handled. FIG. 4 illustrates how a caller can reconnect to an emergency services call after attempting to disconnect. FIG. 5 illustrates how a ringback function is provided after the caller has attempted to disconnect, and FIG. 6 illustrates how the emergency services call is ultimately released. FIG. 7 provides an alternate technique for establishing an emergency services call. FIG. 8 illustrates network forced hold behavior applicable to those communication clients which have no awareness of special forced hold behaviors. This method can be used for providing a less robust forced hold capability for emergency services or for applying forced hold in other service scenarios.

For these communication flows, assume the communication client 26 is provided in a network termination device (NTD) 28, which supports a POTS telephone 30. The emergency services call will be initiated from the POTS telephone 30. Further, a packet communication session is established between the communication client 26 (NTD 28) and the media gateway 22 for the emergency services call. Although not specifically illustrated, a circuit-switched connection is established to the emergency services access point 16 in traditional fashion from the media gateway 22 under the control of the signaling gateway 24. The thrust of the present invention relates to establishing and controlling the packet session established between the communication client 26 and the media gateway 22.

With particular reference to the communication flow of FIG. 2, establishment of an emergency services call is illustrated, wherein the communication client 26 is able to recognize initiation of an emergency services call and indicate that the call is an emergency services call by sending a Session Initiation message to the service node 40 to initiate the emergency services call. Accordingly, the communication client 26 may be provisioned with a dialing pattern corresponding to any or all available dialing plans corresponding to an emergency services call. For example, the dialing pattern may be configured to detect the following dialing plans corresponding to emergency services calls: 911, 1911, 0911, and 101xxxx911. To alert the service node 40 that the call being initiated is an emergency services call, the SIP Invite message may include indicia indicating that the call is an emergency services call. In one embodiment, the priority or resource-priority header(s) and the SIP Invite message may include identification of the call as an emergency services call.

To initiate the emergency services call, a caller will take the POTS telephone 30 offhook and dial digits, such as 911, corresponding to an emergency services call. Accordingly, the communication client 26 will recognize that the POTS telephone 30 has gone offhook, and will receive the dialed digits (step 100). The communication client 26 will monitor the dialed digits and detect when dialed digits correspond to an emergency services call (step 102). The communication client 26 will proceed to invoke a session establishment with the service node. An example of the session establishment procedure is to create an Invite message that identifies the call as an emergency services call in the priority or resource-priority header(s), includes the number dialed for the emergency services call, and provides SDP information (SDPa) representing the communication parameters for initiating a packet communication session with the communication client 26. The dialed digits are provided to the service node 40 in the form of an address (911@domain).

The communication client 26 will then send the Invite message to the service node 40 (step 104), which will respond with a 100 Trying message (step 106) to indicate to the communication client 26 that the service node 40 is attempting to establish the packet communication session. The service node 40 will interact with the signaling gateway 24 to establish the circuit-switched connection for the emergency services call between the media gateway 22 and the emergency services access point 16. This may be done for example by sending an ISUP Initial Address Message (IAM) (step 108). In response, the signaling gateway 24 will take the requisite action to establish the circuit-switched connection in traditional fashion (step not shown). The service node 40 will then establish a session with the media gateway 22 by sending, for example, an Initiation message including the SDP information for the communication client 26 (SDPa) to the media gateway 22 (step 110). The media gateway 22 will reply with its own SDP information (SDPb) (step 112), which will allow the communication client 26 to communicate with the media gateway 22 via the packet communication session to be established. The service node 40 will then forward the SDP information for the media gateway 22 (SDPb) to the communication client 26 in a 183 Session Progress message (step 114).

As the circuit-switched connection is being established, the service node 40 is able to determine if forced hold is available and should be applied. This may become known in a variety of ways, such as through indication in an Address Complete Message (ACM) sent through the signaling gateway 24 from the PSTN 14 (step 116), or through provisioned data associated with a trunking group. Once the circuit-switched connection is established over the PSTN 14 between the media gateway 22 and the emergency services access point 16, the service node 40 will receive notification and relay information to the communication client 26. For example, the signaling gateway 24 may receive an Answer Message (ANM) from the PSTN 14 (step not shown), and forward it to the service node 40 (step 118). The service node 40 will then send a 200 OK message including the SDP information for the media gateway 22 (SDPb) to the communication client 26 (step 120), which will respond with an Acknowledgement message (ACK) (step 122).

At this point, the communication client 26 has the SDP information for the media gateway 22, and the media gateway 22 has the SDP information for the communication client 26. As such, the packet communication session is established between the communication client 26 and the media gateway 22 (step 124). The packet communication session may use the Real-Time Protocol (RTP) to facilitate the real-time exchange of various types of media, including voice. The communication client 26 will establish an analog connection with the POTS telephone 30 (step 126), wherein the analog connection, packet communication session, and the circuit-switched connection (not shown) support the emergency services call between the POTS telephone 30 and the emergency services access point 16, which will ultimately connect the emergency services call to one of the emergency services operator stations 18.

The communication flow of FIG. 3 illustrates how flash and disconnect attempts are handled after the emergency services call is established. Flash events are events such as placing the POTS telephone 30 onhook and offhook by accident or in an attempt to establish a new connection. The communication client 26 may be configured to ignore or otherwise consume flash events once an emergency services call has been established, instead of taking the normal steps to establish another connection or disconnect the currently established call. Accordingly, if the POTS telephone 30 goes onhook then offhook to create a flash event that is detected by the communication client 26 (step 200), the communication client 26 will ignore the flash event (step 202). As such, the service node 40 is not aware of the flash event, and will maintain the packet communication session between the communication client 26 and the media gateway 22. The communication client 26 will also maintain the interworking between the analog connection with the POTS telephone 30 and the packet communication session with the media gateway 22. If there is an intentional or unintentional disconnect event, such as when the caller places the POTS telephone 30 onhook, the communication client 26 will not take the normal steps to disconnect the emergency services call.

In a SIP environment, a disconnect event normally triggers a Bye message being sent to the service node 40, which will respond by disconnecting the packet communication session as well as instructing the signaling gateway 24 to tear down the circuit-switched connection established through the PSTN 14. When an emergency services call is established and the communication client 26 detects that the POTS telephone 30 is onhook (step 204), the communication client 26 will send a hold indication to the service node 40. This may be achieved by sending another Invite message (often referred to as a Re-Invite message) to the service node 40 instead of a Bye message (step 206). The Re-Invite message may indicate that an emergency services call is in progress in the priority header, as well as providing an indication that the call is effectively held. One of many mechanisms for expressing this is, as illustrated, an SDP field of zero (O-SDP).

In response to the hold notification, the service node 40 may send a Notification to the signaling gateway 24 indicating that a disconnect event has occurred (step 208), as well as send a Hold Connection message to the media gateway 22 (step 210). The media gateway 22 will respond to the Hold Connection message by maintaining the packet communication session with the communication client 26, and may send a Reply message to the service node 40 to acknowledge receipt of the Hold Connection message (step 212). The service node 40 will then send a 200 OK message to the communication client 26 in response to the Re-Invite message (step 214). The communication client 26 will acknowledge the 200 OK message (step 216). At this point, the communication client 26 and the media gateway 22 are maintaining the previously established packet communication session, even though the POTS telephone 30 is onhook or has otherwise provided a disconnect instruction.

Turning now to FIG. 4, a reconnect scenario is provided. In this example, the POTS telephone 30 is placed onhook after an emergency services call has been established, and a disconnect event is detected. After the disconnect event occurs, the POTS telephone 30 goes offhook, which causes the communication client 26 to restore the emergency services call from hold, and causes the service node 40 to take the necessary steps to restore the emergency services call.

The process begins when the communication client 26 detects that the POTS telephone 30 has gone onhook after an emergency services call has been established (step 300). The communication client 26 will indicate to the service node 40 that it has held a call. This may be realized by sending a Re-Invite message indicating that an emergency services call has been established in the priority header, and that media stream has been held (0-SDP) to the service node 40 (step 302). Again, the communication client 26 is configured to implement this special hold processing instead of sending a Bye message when an emergency services call is active. The service node 40 will then send a Notification message identifying the disconnect event to the signal gateway 24 (step 304), which will alert the emergency services access point 16 of the disconnect event (step not shown). The service node 40 will then provide a Hold Connection message to the media gateway 22 (step 306), which will provide a Reply message in acknowledgement of the Hold Connection message (step 308). The service node 40 will then send a 200 OK message back to the communication client 26 (step 310), which will respond with an Acknowledgement message (step 312). At this point, the packet communication session and the circuit-switched connection are maintained, yet the communication client 26, signaling gateway 24, media gateway 22, and the emergency services access point 16 are aware of the disconnect event and are taking the necessary steps to maintain the packet communication session and the circuit-switched connection for the emergency services call.

At some point, the POTS telephone 30 will go offhook again, and the offhook condition will be detected by the communication client 26 (step 314). At this point, the communication client 26 will work with the service node 40 to re-establish the call. This is done for example by sending an Invite message to the service node 40 including an emergency services call indication in the priority or resource-priority header(s), as well as the SDP information for the communication client 26 (SDPa) (step 316). The service node 40 will recognize the reconnect event based on the emergency services call still being active, and send a Notification message identifying the reconnect event to the signaling gateway 24 (step 318), which will take the necessary steps to alert the emergency services access point 16 via the PSTN 14 (step not shown). The service node 40 will send an Initiation message with the SDP information for the communication client 26 (SDPa) to the media gateway 22 (step 320), which will reply with the SDP information for the media gateway 22 (SDPb) to the service node 40 (step 322). The service node 40 will then send a 200 OK message with the SDP information for the media gateway 22 (SDPb) to the communication client 26 (step 324), which will respond with an Acknowledgement message (step 326). At this point, the packet communication session is reinitialized between the communication client 26 and the media gateway 22 (step 328). Further, the circuit-switched connection is restored from hold and the emergency services call will resume.

Turning now to FIG. 5, a communication flow is provided wherein an emergency services call that was subjected to a disconnect event is restored upon an operator triggering a ringback function. The process begins when the communication client 26 detects that the POTS telephone 30 has gone onhook after an emergency services call has been established (step 400). The communication client 26 will indicate to the service node 40 that the call is on hold. This may be realized by sending a Re-Invite message indicating that an emergency services call has been established in the priority header, and that the call has been held (0-SDP) to the service node 40 (step 402). Again, the communication client 26 is configured to implement this special hold processing instead of sending a Bye message, when an emergency services call is active. The service node 40 will then send a Notification message identifying the disconnect event to the signal gateway 24 (step 404), which will alert the emergency services access point 16 of the disconnect, event (step not shown). The service node 40 will then provide a Hold Connection message to the media gateway 22 (step 406), which will provide a Reply message in acknowledgement of the Hold Connection message (step 408). The service node 40 will then send a 200 OK message back to the communication client 26 (step 410), which will respond with an Acknowledgement message (step 412). At this point, the packet communication session and the circuit-switched connection are maintained, yet the communication client 26, signaling gateway 24, media gateway 22, and the emergency services access point 16 are aware of the disconnect event and are taking the necessary steps to maintain the packet communication session and the circuit-switched connection for the emergency services call.

Once the packet communication session is placed on hold in response to the disconnect event, an operator at the emergency services operator terminal 18 may initiate a ringback event in traditional fashion. Accordingly, the emergency services access point 16 will send or forward a ringback instruction to the signaling gateway 24 (step not shown), which will send a Notification message to the service node 40 to trigger a ringback event (step 414). The service node 40 will send a Re-Invite message to the communication client 26 (step 416). The Re-Invite message will identify the emergency services call in the priority header. In this example, no SDP information is provided in the Re-Invite message. The communication client 26 will recognize the Re-Invite message as an initiation of a ringback event, and will then provide a Power Ringing signal or other appropriate alert to the POTS telephone 30 (step 418).

When answered, the POTS telephone 30 will go offhook and the offhook status will be detected by the communication client 26 (step 420), which will send a 200 OK message with its SDP information (SDPa) to the service node 40 (step 422). The service node 40 will send an Initiation message with the SDP information for the communication client 26 (SDPa) to the media gateway 22 (step 424). The media gateway 22 will reply with its SDP information (SDPb) (step 426). The service node 40 will receive the reply and send an Acknowledgement message to the communication client 26 (step 428). The Acknowledgement message will include the SDP information for the media gateway 22 (SDPb). At this point, the packet communication session is reestablished between the communication client 26 and the media gateway 22 (step 430). In the illustrated communication flow, the SDP information negotiation may be exchanged in the reverse order of that illustrated.

From the above, once an emergency services call is established, a disconnect event will not end the emergency services call, but will instead result in the packet communication session effectively being placed on hold, along with the circuit-switched connection between the media gateway 22 and the emergency services access point 16. For a reconnect event or a ringback event, the hold status will be removed to effectively restore the emergency services call. Depending on the configuration, an SDP information negotiation may take place between the communication client 26 and the media gateway 22 via the service node 40.

With reference to FIG. 6, a communication flow is provided to illustrate how the emergency services call can be released. In this embodiment, the release must come from the operator. Accordingly, the signaling gateway 24 will receive an indication that the operator has released the emergency services call (step not shown) and will send a Release message to the service node 40 (step 500). The service node 40 will respond with a Release Complete message (RLC) (step 502), as well as send a Bye message to the communication client 26 to indicate that the packet communication session should be dropped (step 504). The communication client 26 will respond with a 200 OK message (step 506). The service node 40 will then send a Release instruction to the media gateway 22 to indicate that the packet communication session should be dropped (step 508). The media gateway 22 will respond with an appropriate Reply (step 510). At this point, the circuit-switched connection is released, and the packet communication session is dropped for the emergency services call.

In the above embodiments, the communication client 26 was able to detect an emergency services call being initiated, and provide such indication to the service node 40 to assist in initiating the emergency services call. In an alternative embodiment, the communication client 26 is not capable of detecting emergency services calls based on the dialed digits, and instead relies on the service node 40 to provide an indication that the call being initiated is an emergency services call. Such an embodiment is illustrated in the communication flow of FIG. 7.

Initially, the communication client 26 will recognize that the POTS telephone 30 has gone offhook and will collect the dialed digits (step 600). The communication client 26 will not be able to recognize that the dialed digits correspond to an emergency services number, and thus, will attempt to initiate the call in normal fashion. As such, the communication client 26 will send an Invite message including the dialed digits and the SDP information for the communication client 26 (SDPa) to the service node 40 (step 602). The service node 40 will respond by sending a 100 Trying message to the communication client 26 (step 604). Further, the service node 40 will recognize that the dialed digits correspond to an emergency services number, and will provide information to the communication client 26 indicating that the call being initiated is an emergency services call. Such an indication may be provided in any of the messages sent to the communication client 26, including the 100 Trying message. As illustrated in FIG. 7, the information is provided in a separate Information (Info) message (step 606).

To initiate the emergency services call, the service node 40 will proceed as with any call initiation by sending an IAM to the signaling gateway 24 (step 608), which will take the necessary steps to establish the circuit-switched between the media gateway 22 and the emergency services access point 16 (steps not shown). The service node 40 will also send an Initiation message including the SDP information for the communication client 26 (SDPa) to the media gateway 22 (step 610). The media gateway 22 will send a Reply message including the SDP information for the media gateway 22 (SDPb) to the service node 40 (step 612). The service node 40 will then send a 183 Session Progress message including the SDP information for the media gateway 22 (SDPb) to the communication client 26 (step 614).

While setting up the circuit-switched connection, the signaling gateway 24 will receive an ACM from the PSTN 14 indicating that a forced hold is available and being applied (step not shown). Upon receipt of the ACM, the signaling gateway 24 will send an ACM to the service node 40 indicating that the forced hold is available and being applied (step 616). When the circuit-switched connection is answered by the emergency services access point 16 or an operator, the signaling gateway 24 will receive an ANM via the PSTN 14 (step not shown). The signaling gateway 24 will send the ANM to the service node 40 (step 618), which will send a 200 OK message to the communication client 26 (step 620). The 200 OK message may include the SDP information for the media gateway 22 (SDPb). The communication client 26 will respond with an Acknowledgement message (step 622).

Although the above embodiments illustrate a communication client 26 being implemented in a network termination device 28 supporting a separate POTS telephone 30, the above communication flows remain the same with respect to establishing and controlling the packet communication session for an emergency services call when the implementation of the communication client 26 changes. Instead of the communication client 26 providing an analog connection to the POTS telephone 30 via the network termination device 28, the communication client 26 may be integrated into a communication terminal, wherein a user interface is used to detect onhook and offhook states, as well as recognize dialed digits, flash events, disconnect events, and connect events. In essence, the use of a separate POTS telephone 30 or an integrated VoP terminal 38 are treated the same with respect to the packet communication session and controlling the packet communication session and circuit-switched connection associated with the emergency services call.

Turning now to FIG. 8, a reconnect scenario is provided involving a communication client 26 which is not aware of forced hold requirements or capabilities and therefore does not cooperate in any special way with the service node 40 in providing the forced hold capability. In this example, the POTS telephone 30 is placed onhook after an emergency services call has been established, and a disconnect event is detected. After the disconnect event occurs, the POTS telephone 30 goes offhook, which causes the communication client 26 to attempt to establish a new communication session. The service node 40, however, will take the necessary steps to restore the emergency services call rather than establish the new communication session. Notably, the communication client 26 is unaware of the forced hold applicable to the call, and takes no forced hold actions to preserve it. As such, the service node 40 provides the forced hold functionality without any assistance from the communication client 26.

The process begins with an existing emergency services call established as represented by the packet session (step 700). The communication client 26 detects the POTS telephone 30 going onhook (step 702). Unlike the prior examples, the communication client 26 will not indicate to the service node 40 that the call is being held for the forced hold. Instead, a typical disconnect event (disconnect or hold) is processed and a Bye message is sent to the service node 40 (step 704). The service node 40 will independently determine that a forced hold should be applied (step 706), and then send a Notification message identifying the disconnect event to the signal gateway 24 (step 708), which will alert the emergency services access point 16 of the disconnect event (step not shown). The service node 40 will then provide a Hold Connection message to the media gateway 22 (step 710), which will provide a Reply message in acknowledgement of the Hold Connection message (step 712). The service node 40 will then send a 200 OK message back to the communication client 26 (step 714), which will respond with an Acknowledgement message (step 716). At this point, the packet communication session is preserved in the service node 40 as is the circuit-switched connection, yet the communication client 26 is not aware that any special handling has taken place.

At some point, the POTS telephone 30 will go offhook again, and the offhook condition will be detected by the communication client 26 (step 718). At this point, the communication client 26 attempts to initiate a new communication session and will provide a dial tone to the telephone 30 (step 720). The user can dial any number to cause the dialed digits to be provided to the communication client 26 (step 722). In traditional fashion, the communication client 26 will send an Invite message in an attempt to initiate a call to a destination corresponding to the dialed digits (step 724). The service node 40 will recognize that the communication client 26 must be reconnected to the emergency services call session and will instead process a reconnect event, and send a Notification message identifying the reconnect event to the signaling gateway 24 (step 726), which will take the necessary steps to alert the emergency services access point 16 via the PSTN 14 (step not shown). The service node 40 will send an Initiation message with the SDP information for the communication client 26 (SDPa) to the media gateway 22 (step 728), which will reply with the SDP information for the media gateway 22 (SDPb) to the service node 40 (step 730). The service node 40 will then send a 200 OK message with the SDP information for the media gateway 22 (SDPb) to the communication client 26 (step 732), which will respond with an Acknowledgement message (step 734). At this point, the packet communication session is reinitialized between the communication client 26 and the media gateway 22 (step 736). Further, the circuit-switched connection is restored from hold and the emergency services call will resume.

Figure 9:
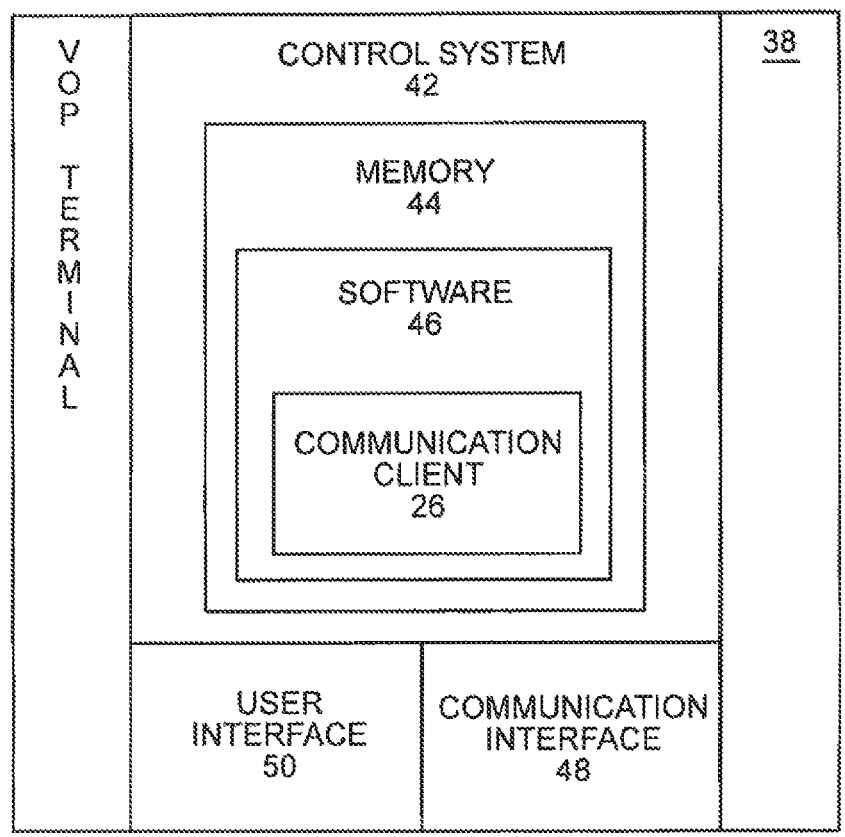
FIG. 9 is a block representation of a VoP terminal according to one embodiment of the present invention.

With reference to FIG. 9, a VoP terminal 38 is illustrated. The VoP terminal may include a control system 42, which is associated with memory 44 having sufficient software 46 to provide the functionality described above. In particular, the software 46 may include the communication client 26 as well as one or more associated applications. The control system 42 is also associated with an appropriate communication interface 48 to facilitate packet communication sessions and any requisite signaling over the core packet network 12. Further, the VoP terminal may include a user interface 50 through which user input is received and information may be displayed to the user. The communication interface 48 and the user interface 50 will vary depending on the nature of the VoP terminal 38.

Figure 10:
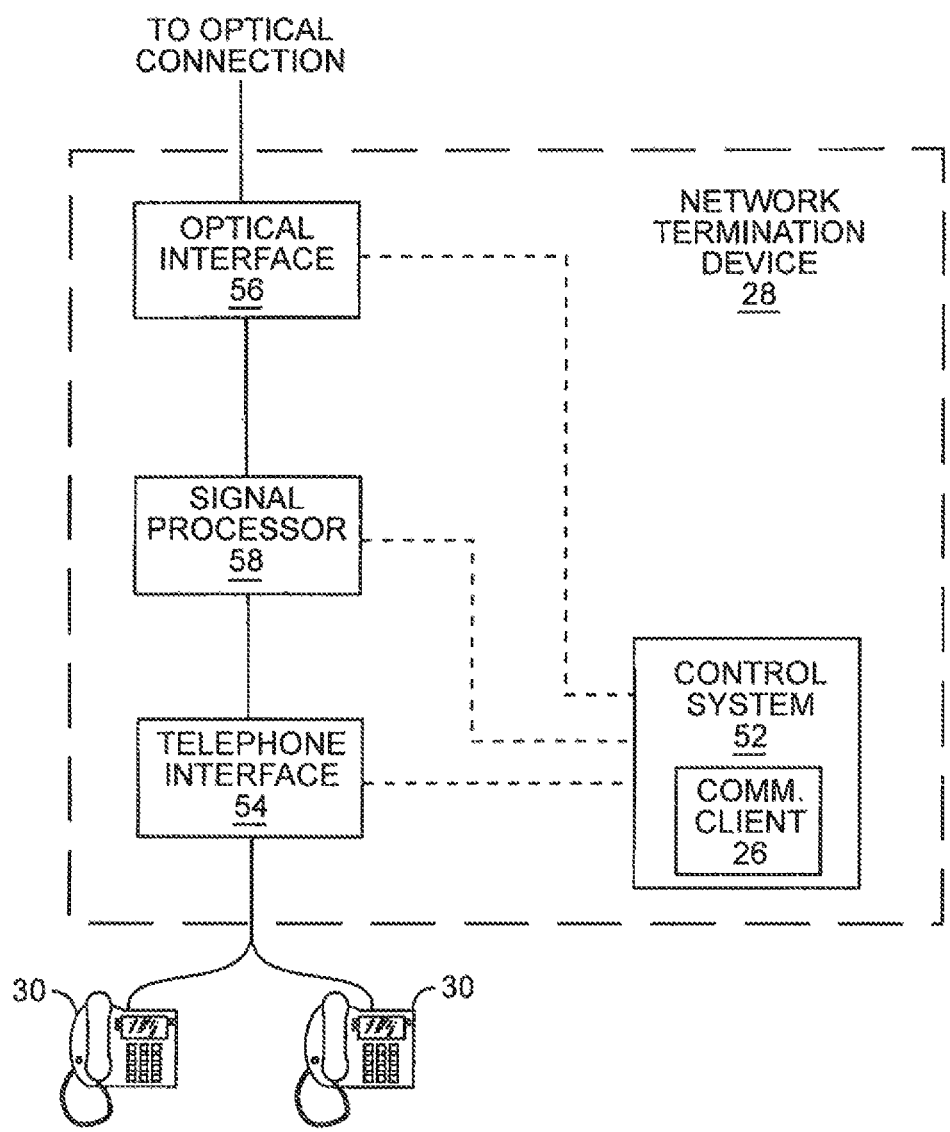
FIG. 10 is a block representation of a network terminal device according to one embodiment of the present invention.

A block representation of a network termination device 28 is provided in FIG. 10. Preferably, the network termination device 28 will include a control system 52 operatively associated with a telephone interface 54 emulating an analog POTS line supporting the POTS telephones 30, an optical (or copper) interface 56 for terminating an optical (or copper) access network line leading directly or indirectly to the core packet network 12, and a signal processor 58. The signal processor 58 is effectively part of the control system 52, and is capable of providing all the necessary coding, decoding, and conversions necessary for the optical interface 56 to operate with the telephone interface 54. The control system 52 also provides the communication client 26, which functions as described above.

Figure 11:
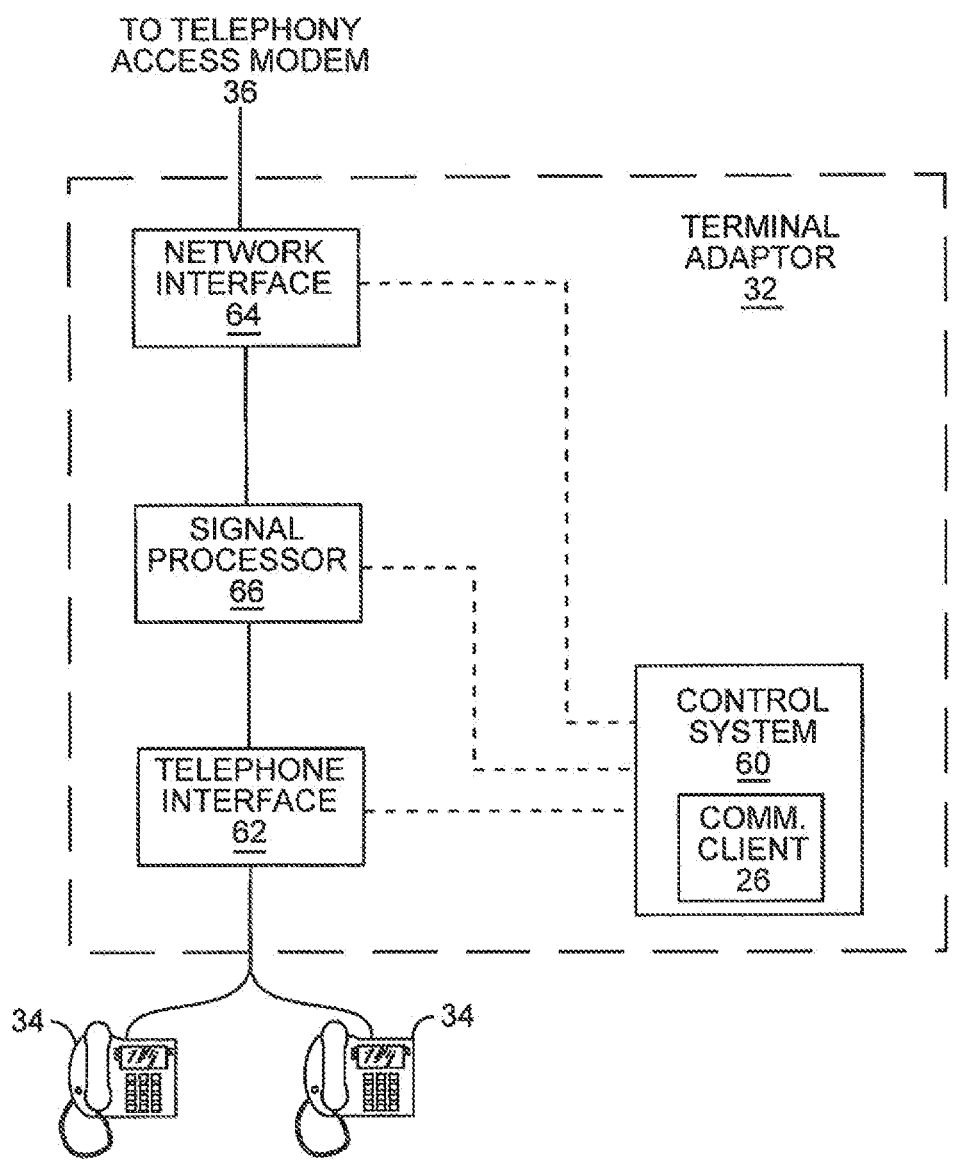
FIG. 11 is a block representation of a terminal adaptor according to one embodiment of the present invention.

A block representation of a terminal adaptor 32 is provided in FIG. 11. The terminal adaptor 32 will include a control system 60 operatively associated with a telephone interface 62 emulating an analog POTS line supporting the POTS telephones 34, a network interface 64 leading directly or indirectly via the access modem 36 to an access network, which is connected to the core packet network 12, and a signal processor 66. The signal processor 66 is effectively part of the control system 60, and is capable of providing all the necessary coding, decoding, and conversions necessary for the network interface 64 to operate with the telephone interface 62. The control system 60 also provides the communication client 26, which functions as described above.

Figure 12:
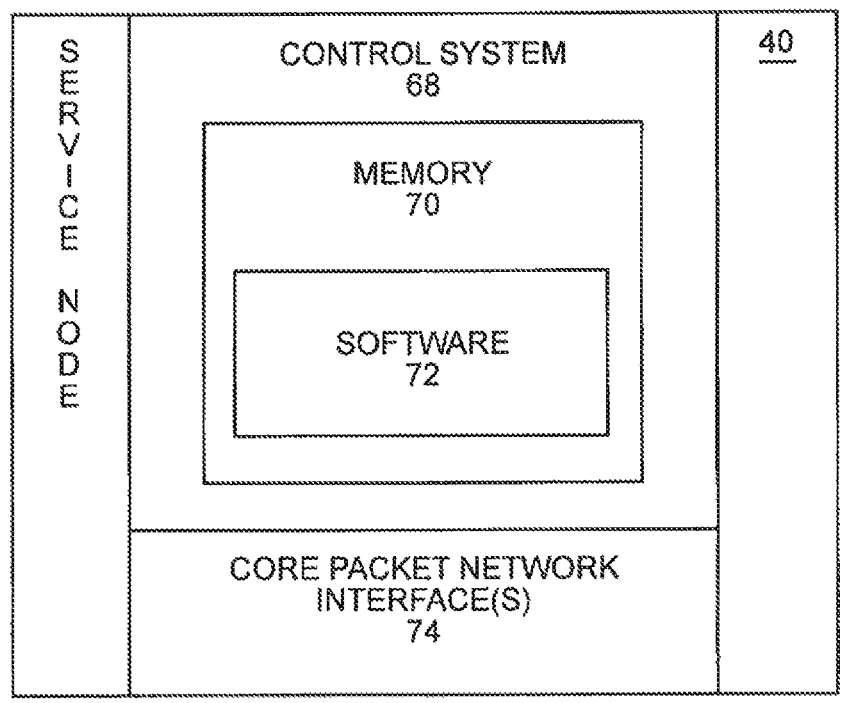
FIG. 12 is a block representation of a service node according to one embodiment of the present invention.

Turning now to FIG. 12, a block diagram of a service node 40 is illustrated. The service node 40 will include a control system 68 having sufficient memory 70 to store the software 72 necessary for operation as described above. The control system 68 is also associated with one or more packet network interfaces 74 to facilitate communications over the core packet network 12.

Those skilled in the art will recognize improvements and modifications to the preferred embodiments of the present invention. All such improvements and modifications are considered within the scope of the concepts disclosed herein and the claims that follow.

What is claimed is:

1. A method of handling a packet communication session, comprising:
    receiving, from a communications client, a session initiation message comprising information associated with a requirement to maintain a communication session;
    establishing a packet communication session with the communications client;
    receiving, from the communications client, a message comprising information indicative of an attempt to interrupt the communication session; and
    maintaining the communication session notwithstanding the received message comprising information indicative of an attempt to interrupt the communication session, wherein the message comprising information indicative of an attempt to interrupt the communication session comprises a re-invite message having an indication that an emergency services call is in progress and an indication that the call is held.

2. The method of claim 1, wherein maintaining the communication session notwithstanding the received message comprising information indicative of an attempt to interrupt the communication session comprises putting the packet communication session on hold.

3. The method of claim 1, wherein the information associated with a requirement to maintain a communication session comprises information indicative of an emergency services call.

4. The method of claim 1, wherein the information associated with a requirement to maintain a communication session comprises dialed digits associated with a requirement to maintain a call.

5. The method of claim 4, wherein the dialed digits associated with a requirement to maintain a communication session comprises dialed digits associated with an emergency services call.

6. The method of claim 1, wherein the information associated with a requirement to maintain a communication session is provided in a priority header of the session initiation message.

7. The method of claim 1, wherein establishing a packet communication session comprises establishing a packet communication session between the communications client and a media gateway, the media gateway being connected to an access point of a switched telephone network.

8. The method of claim 7, wherein maintaining the communication session notwithstanding the received message comprising information indicative of an attempt to interrupt the communication session comprises sending the media gateway a hold connection message.

9. The method of claim 7, wherein establishing a packet communication session comprises establishing a circuit-switched connection between the media gateway and the access point of the switched network via a signaling gateway connected to the switched network.

10. The method of claim 9, wherein maintaining the communication session notwithstanding the received message comprising information indicative of an attempt to interrupt the communication session comprises sending the signaling gateway notification of the attempt to interrupt the communication session.

11. The method of claim 2, further comprising:
    receiving a message indicating an attempt by a caller to reconnect the packet communication session put on hold; and
    in response to the message indicating an attempt by a caller to reconnect the packet communication session, restoring the packet communication session put on hold.

12. The method of claim 2, further comprising:
    receiving a message indicating an attempt by an operator to reconnect the packet communication session put on hold; and in response to the message indicating an attempt by an operator to reconnect the packet communication session, restoring the packet communication session put on hold.

13. The method of claim 1, further comprising:
receiving a release message from an entity other than the communications client; and
sending an end message to the communications client in response to the release message.

14. The method of claim 13, further comprising:
receiving a response from the communications client acknowledging the end message; and
disconnecting the communication session in response to the acknowledgement.

15. The method of claim 2, further comprising:
receiving a message indicating an attempt by a caller to reconnect the packet communication session put on hold; and
in response to the message indicating an attempt by a caller to reconnect the packet communication session, restoring the packet communication session put on hold, wherein restoring the packet communication session comprises:
sending a signaling gateway notification of the attempt to reconnect; and
sending a media gateway an initiation message.

16. The method of claim 2, further comprising:
receiving a message indicating an attempt by an operator to reconnect the packet communication session put on hold; and
in response to the message indicating an attempt by an operator to reconnect the packet communication session, restoring the packet communication session put on hold, wherein restoring the packet communication session comprises:
sending a signaling gateway notification of the attempt to reconnect; and
sending a media gateway an initiation message.

17. The method of claim 10, further comprising:
receiving a release message from an entity other than the communications client;
sending the signaling gateway a release complete notification; and
sending an end message to the communications client in response to the release message.

18. The method of claim 17, further comprising:
receiving an acknowledgement from the communications client acknowledging the end message; and
disconnecting the communication session in response to the acknowledgement wherein disconnecting the communication session comprises sending release instructions to the media gateway.

19. A method of operating a communications client to handle a packet communication session, comprising:
receiving signaling indicating a request to establish a communication session;
determining that the communication session must be maintained;
sending a session initiation message to a service node, the session initiation message comprising information associated with a requirement that the communication session must be maintained;
detecting an attempt to interrupt the communication session; and
sending to the service node a message indicative of an attempt to interrupt the communication session, wherein the message is a re-invite message comprising an indication that an emergency services call is in progress and an indication that the call is held.

20. The method of claim 19, wherein determining that the communication session must be maintained comprises detecting that the communications session is an emergency services call.

21. The method of claim 19, wherein determining that the communication session must be maintained comprises detecting dialed digits associated with a requirement that the communication session must be maintained.

22. The method of claim 21, wherein the dialed digits associated with a requirement that the communication session must be maintained comprise dialed digits associated with an emergency services call.

23. The method of claim 19, wherein the information associated with a requirement that the communication session must be maintained is provided in a priority header of the session initiation message.

24. The method of claim 19, wherein detecting an attempt to interrupt the communication session comprises detecting at least one flash signal.

25. The method of claim 19, wherein detecting an attempt to interrupt the communication session comprises detecting an on-hook condition.

26. The method of claim 19, further comprising:
detecting an attempt by a caller to reconnect the packet communication session; and
sending a message indicating an attempt by a caller to reconnect the packet communication session to the service node.

27. The method of claim 26, wherein detecting an attempt to reconnect the packet communication session comprises detecting an off-hook condition.

28. The method of claim 26, further comprising:
receiving a ringback message from the service node indicating an attempt by an operator to reconnect the packet communication session;
delivering a ringback alert in response to the ringback message; and
re-establishing communications over the packet communication session in response to the ringback message.

* * * * *